P. CATUCCI.
FISHING REEL.
APPLICATION FILED MAR. 7, 1910.
1,027,179. Patented May 21, 1912.
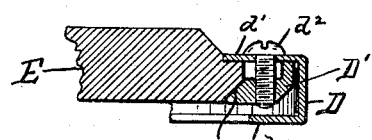
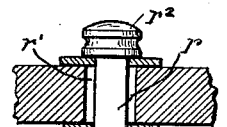
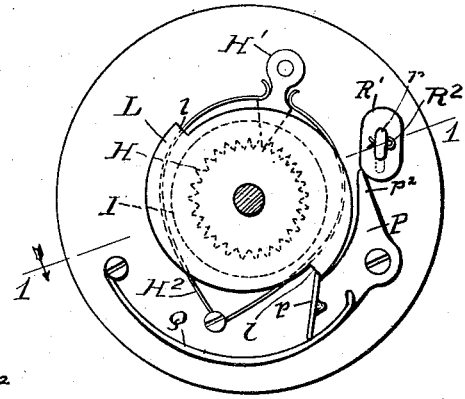
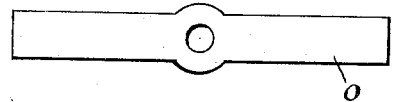
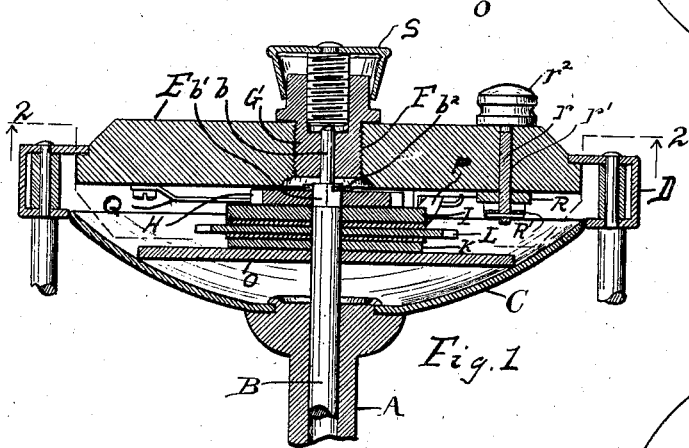
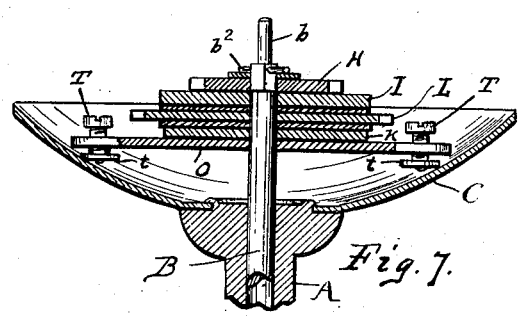
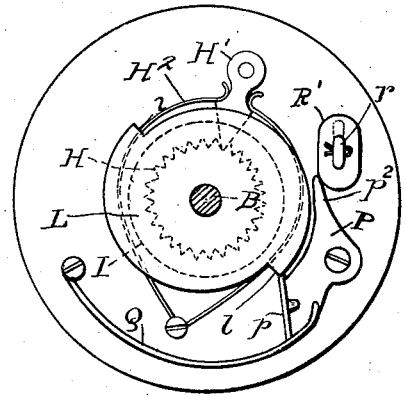
WITNESSES:
M. L. Sanders
Louis Sanders Jr.
INVENTOR
Pliny Catucci
BY Louis M. Sanders
ATTORNEY

UNITED STATES PATENT OFFICE.

PLINY CATUCCI, OF NEWARK, NEW JERSEY, ASSIGNOR TO A. F. MEISSELBACH & BRO., OF NEWARK, NEW JERSEY, A CORPORATION OF NEW JERSEY.

FISHING-REEL.

1,027,179.  Specification of Letters Patent.  Patented May 21, 1912.

Application filed March 7, 1910. Serial No. 547,924.

*To all whom it may concern:*

Be it known that I, PLINY CATUCCI, a citizen of the United States, residing in the city of Newark and county of Essex, State of New Jersey, have invented certain new and useful Improvements in Fishing-Reels; and I do declare the following to be a full, clear, and exact description of the same, such as will enable others skilled in the art to which it pertains to make, construct, and use the same.

One of the essential features of the modern fishing reel is that it shall be provided with an effective drag, that is to say, a tension device which, in operation, will introduce such a retarding effect, technically called "drag," upon the paying out of the fishing line as to very shortly tire out the fish, which may be caught, and thus relieve the continued strain upon the muscles of the fisherman in playing the fish. Such a drag should be very easy of manipulation and quickly thrown in and out of operation.

My invention, as hereinafter set forth, accomplishes these various objects by means of mechanism at once simple in construction, easy of manipulation, not liable to get out of order, and quickly accessible for purposes of cleaning and oiling.

In carrying out my invention I make use of the structures illustrated in the accompanying drawing and fully describing it in detail in the following specification, in which, Figure 1 is a sectional view on line 1—1 of Fig. 2 of a fishing reel head-plate and head-ring showing a portion of the spool in connection. Fig. 2 is a sectional view on line 2—2 (but with the head-ring omitted) of Fig. 1, looking in the direction of the arrow showing the drag pawl in operation. Fig. 3 is similar to Fig. 2 but with the drag pawl shown out of operative position. Fig. 4 is a perspective view of the pawl above referred to. Figs. 5 and 6 are sectional views of details. Fig. 7 illustrates a modification. Fig. 8 is a plan view of the spring bar.

Similar letters of reference refer to like parts throughout the specification and drawings.

In Fig. 1 I have shown only a sufficient portion of the fishing reel in section to illustrate the location and operation of my improvements.

A is the usual spool rigidly mounted upon the spindle B, and provided with the spool head C. The head ring D is of any usual or preferred construction. As shown it consists of a ring channel-shaped in cross-section, with the flanges projecting toward the center of the circular form. Secured in this ring D, in any desired or preferred manner, is the head plate E, such head plate being made of hard rubber and provided with the central screw threaded aperture F, in which the pivot bearing G, for the spindle B is located.

The spindle B is provided, as usual with the pivot $b$ which takes into the bearing G in the usual manner. Next, back of the pivot $b$ is the short squared portion $b^1$ upon which is mounted the usual click wheel H; such click wheel being held upon this squared portion $b^1$ by means of a spring cotter pin $b^2$. The click $H^1$ and the spring $H^2$ bearing upon the opposite sides of the click $H^1$, as shown in Figs. 2 and 3. Mounted also upon the spindle B, are the plates or disks, I and K, between which is located the ratchet disk L; these disks may be separated by disks of friction paper if desired. Lastly I mount upon this same spindle B, the spring bar O, the ends of which bear directly upon the curved inner side of the spool-head C.

It will now be seen that I have provided a series of friction disks, I, K, L, said disks being located between the click wheel H, and the spring bar O, all being held in position by the cotter pin $b^2$, on the one side and the spool head C on the other side. At the same time those disks are all free to move with respect to each other and with respect to the click wheel H and the spring bar O, their relative movements, however, being resisted or retarded because of the friction between their adjacent faces or the faces of the disks and sheets of paper, M, M, and yet the whole structure, that is, the disks just described, together with the spool A, are free to revolve upon the pivot $b$. If, now, some stop mechanism is provided for the middle or ratchet disk L, it will be seen that an effective drag will be interposed to retard the motion of the spool in one direction. In order to provide such drag mechanism I pivotally mount upon the inner face of the head-plate E, the pawl P. This pawl consists of an upturned portion $p$, at one end and a rearwardly projecting tailpiece $p^2$, the up-turned portion $p$ being located in such a position as to swing into the path of the teeth $l$ of the ratchet disk L, as clearly illustrated in Figs. 2 and 3. In order that this pawl may be automatically swung into position, I provide a wire spring, Q, mounting same upon the inner face of the head-plate E, with its free end bearing upon the pawl $p$ as clearly shown in Figs. 2 and 3. Under the influence of the spring Q, the pawl P will always be in position to engage with the ratchet teeth $l$, $l$.

In order to provide means for disengaging the pawl from the ratchet teeth and throwing it out of their path, I provide the cam device R, lying in the path of the tail $p^2$, of the pawl P, securing such cam upon the slide bar $r$, by means of the spring $R^1$ and the cotter $R^2$, which projects through the slot $r^1$, in the head plate E. The slot $r^1$ is of greater length than the width of the bar $r$, being provided on the external surface of the head plate E, with the button $r^2$. It will thus be seen that the movement of the cam R from one position to the other will actuate the pawl $p$ or throw the same into or out of the path of the ratchet teeth $l$, and that when such pawl lies in the path of the ratchet teeth $l$ and engages with one or the other of the same, the spool A cannot revolve without first overcoming the friction drag of the ratchet disk L with the adjacent disks, I and K; and yet the rotation of the spool A in the opposite direction is not in any manner affected, for the reason that the ratchet teeth $l$ will simply depress the pawl $p$ against the spring Q when the spool is rotated in the opposite direction, this direction being commonly called the "wind-up" direction. The drag is therefore effective only in the paying out direction.

I have also shown in Fig. 1, the combined dust cap and pivot adjustment S; the same being screwed into the pivot bearing G. I make no claim, however, to this structure as the same is shown in a co-pending application Ser. No. 547,925, filed March 7, 1910.

In case it is desired to increase the degree of drag upon the spool, the cotter pin, $b^2$, may be bent in such a manner that its ends will bear with greater pressure upon the face of the click wheel H, or, if desired, it may be removed and one or more thin washers may be placed upon the squared spindle shank, $b^1$, between the cotter pin and the click wheel H.

In case still further adjustment of the disks, I and K may be desired, I may provide the ends of the spring-bar, O, with the screws, T, which screw through the ends of the said bar and are provided with the shoes, $t$, which bear upon the inner face of the spool head, C, and by screwing these screws, T, in or out, the shoes, $t$ will bear with greater or less pressure upon the spool head, C, and consequently cause greater or less pressure between the plates, I and K, upon the ratchet disk, L.

As a means for securing the head plate, E, in the head ring, D, I make use of the structure illustrated in Fig. 5, wherein it is shown that the head plate, E, is of a diameter sufficient to pass the inner flange, $d$, and rest upon the outer flange, $d^1$.

The lower margin of the plate, E, is provided with the chamfered notches, $e$, to receive the beveled sides of the elbow nuts, $D^1$, the turned up ends of which bear upon the inner face of the flange, $d^1$, as shown. The screws, $d^2$, pass through the upper flange, $d^1$, into the nut, $D^1$, and thus clamp the head plate, E, against the flange, $d^1$.

I have shown this construction in the above co-pending application and make no specific claim to the same herein.

It must not be understood that the frictional drag is intended to be the equivalent of, or take the place of the present well known click wheel drag. On the contrary, it is intended to be used in conjunction with the click wheel, which is not to be disturbed in its functions.

My invention, therefore, may be considered in the nature of an emergency device, to be used only in case where the click wheel drag may not be sufficiently effective.

I claim:

1. In a fishing reel, the combination of a spool spindle, with a plurality of friction plates mounted upon said spindle to rotate therewith means for arresting the rotation of one of said plates in one direction, while permitting its free rotation in the opposite direction.

2. In a fishing reel, the combination of a spool spindle, a pair of friction plates mounted upon said spindle between yielding abutments, a third friction plate mounted upon said spindle between, and frictionally engaging, the first named plates, and means for arresting the free rotation of said third plate in one direction, said means permitting free opposite rotation.

3. In a fishing reel, the combination of a spool spindle, a plurality of friction plates mounted upon said spindle, to rotate therewith, yielding abutments also mounted upon said spindle and bearing upon said friction plates, and means for arresting the rotation of one of said friction plates, whereby a friction drag is offered to the free rotation of said spindle.

4. In a fishing reel, the combination of a normally freely rotating spool spindle, two yielding abutments concentrically mounted upon said spindle to rotate therewith, a plurality of friction plates also concentrically mounted upon spindle between said abutments, to normally rotate therewith, and means for arresting the rotation of one of said plates in one direction.

5. In a fishing reel, the combination of a normally freely rotating spool spindle, two yielding abutments concentrically mounted upon the said spindle to rotate therewith, a plurality of friction plates also concentrically mounted upon said spindle between said abutments to normally rotate therewith and manually operated means for arresting the rotation of one of said plates in one direction, while freely permitting the free rotation of the spindle, abutments and plates in the opposite direction.

6. In a fishing reel, the combination of a normally free running spool, a spindle upon which said spool is rigidly mounted, a plurality of friction disks concentrically mounted upon said spindle to normally rotate therewith, yielding abutments also mounted upon said spindle to rotate therewith and frictionally engage the pair of said disks, and means for arresting the rotation of one of said disks in one direction while freely permitting the free rotation of the spindle and disks in the opposite direction.

7. In a fishing reel, the combination of the spool frame and head-plates, with a plurality of friction plates secured to the spool spindle to revolve with the spool and means for arresting the rotation of one of said plates in one direction to interpose a friction drag upon the rotation of said spool while permitting its free rotation in the opposite direction.

This specification signed and witnessed this 2d day of March 1910.

PLINY CATUCCI.

Witnesses:
MERVIN L. SANDERS,
W. B. WALTZINGER.